United States Patent
Lacey (10) Patent No.: US 10,904,079 B2
(45) Date of Patent: Jan. 26, 2021

(54) VIRTUALIZED NETWORK FUNCTION INTERWORKING

(71) Applicant: Comptel Oy, Helsinki (FI)

(72) Inventor: Stephen Lacey, Nummela (FI)

(73) Assignee: Comptel Oy, Helsinki (FI)

( * ) Notice: Subject to any disclaimer, the term of this patent is extended or adjusted under 35 U.S.C. 154(b) by 143 days.

(21) Appl. No.: 16/076,133

(22) PCT Filed: Feb. 8, 2017

(86) PCT No.: PCT/FI2017/050072
§ 371 (c)(1),
(2) Date: Aug. 7, 2018

(87) PCT Pub. No.: WO2017/137662
PCT Pub. Date: Aug. 17, 2017

(65) Prior Publication Data
US 2020/0084096 A1  Mar. 12, 2020

(30) Foreign Application Priority Data

Feb. 8, 2016  (EP) ..................... 16154636

(51) Int. Cl.
*H04L 12/911* (2013.01)
*H04L 12/24* (2006.01)
*H04L 12/66* (2006.01)

(52) U.S. Cl.
CPC .......... *H04L 41/0806* (2013.01); *H04L 12/66* (2013.01); *H04L 41/145* (2013.01); *H04L 41/20* (2013.01); *H04L 47/827* (2013.01)

(58) Field of Classification Search
None
See application file for complete search history.

(56) References Cited

U.S. PATENT DOCUMENTS

| | | | |
|---|---|---|---|
| 2014/0317293 A1* | 10/2014 | Shatzkamer | G06F 9/45558 709/226 |
| 2015/0180730 A1 | 6/2015 | Felstaine et al. | |
| 2015/0288767 A1 | 8/2015 | Fargano et al. | |
| 2015/0288541 A1 | 10/2015 | Fargano et al. | |

(Continued)

FOREIGN PATENT DOCUMENTS

| | | |
|---|---|---|
| CN | 105307217 A | 2/2016 |
| EP | 2849064 A1 | 3/2015 |

(Continued)

OTHER PUBLICATIONS

European Patent Office, European search report dated Jul. 12, 2016 in EP patent application No. 16154636.1.

(Continued)

*Primary Examiner* — Brian Whipple (57) ABSTRACT

According to an example aspect of the present invention, there is provided a system comprising a memory configured to store a list of virtualized network functions, VNFs, active in a first Network (101), and at least one processing core configured to process a request, originating in a second network (102), requesting to run a first VNF in the first network on behalf of the second network, and based at least partly on the request, to cause instantiation of the first VNF in the first network.

13 Claims, 6 Drawing Sheets

(56) References Cited

U.S. PATENT DOCUMENTS

2015/0326535 A1\* 11/2015 Rao .................... H04L 41/5054
                                                              726/15
2015/0358248 A1   12/2015 Saha et al.
2016/0248858 A1\*  8/2016 Qiu ........................ H04W 4/60

FOREIGN PATENT DOCUMENTS

| EP | 2955631 A1 | 12/2015 |
|----|------------|---------|
| WO | 20140182900 A1 | 11/2014 |
| WO | 2015055102 A1 | 4/2015 |

OTHER PUBLICATIONS

S. Clayman et al., "The dynamic placement of virtual network functions", Proceeding of IEEE Network Operations and Management Symposium (NOMS), May 5-8, 2014, Krakow, Poland.

\* cited by examiner

VIRTUALIZED NETWORK FUNCTION INTERWORKING

PRIORITY

This application is a U.S. national application of the international application number PCT/FI2017/050072 filed on 8 Feb. 2017, which claims priority of European patent applications EP16154636.1 filed on Feb. 8, 2016, the contents of all of which are incorporated herein by reference.

FIELD

The present application relates to virtualized network functions in communication networks.

BACKGROUND

Communication networks, such as for example cellular communication networks, are comprised of network nodes. The network nodes of a network may be subdivided into different node types, for example, a cellular communication network may comprise base stations, base station controllers, switches, gateways and application functions. An internet protocol, IP, network may comprise routers and gateways.

When designing a network, planners may estimate loading situations in a coverage area of the network. For example, in busy sections of cities it may be estimated that communication occurs more often, and at a higher intensity, than in outlying areas. Therefore, in the case of a cellular network, cells in busier areas may be made smaller, and base stations assigned to control these smaller cells may be furnished with sufficient data processing capability to handle high peak loads. For example, the base stations may be equipped with several data processing cards. Likewise, network nodes tasked with conveying data to and from base stations with high anticipated peak loads may be dimensioned to be capable of handling these high loads.

Virtualization of network functions may be employed to simplify network maintenance. In a network where functions have been, at least in part, virtualized, virtualized network functions may be run as software entities on server computers, which may be located in a datacentre, for example. Depending on the type of network function being virtualized, for example depending on whether the function is simple or complex, a virtualized network function, VNF, may be split into multiple VNF components, VNFCs. An example of a simple VNF is a firewall, while a home location register is an example of a complex VNF.

Interworking of networks with each other may comprise, for example, that gateway functions are arranged at edges of network domains, the gateways being arranged to convey information to and from the network domain in which they are comprised.

SUMMARY OF THE INVENTION

The invention is defined by the features of the independent claims. Some specific embodiments are defined in the dependent claims.

According to a first aspect of the present invention, there is provided a system comprising a memory configured to store a list of virtualized network functions, VNFs, active in a first network, and at least one processing core configured to process a request, originating in a second network, requesting to run a first VNF in the first network on behalf of the second network, and based at least partly on the request, to cause instantiation of the first VNF in the first network.

Certain embodiments of the first aspect may comprise at least one feature from the following bulleted list:
- the at least one processing core is further configured to allocate resources to the first VNF
- the at least one processing core is further configured to allocate resources to the first VNF dynamically
- the system is configured to configure the first VNF with at least one interface to the second network
- the system is configured to compile first information, describing an extent of resource usage of the first VNF in the first network
- the resources comprise at least one of electrical power, increased radio interference, processing resources and memory resources
- the system is further configured to participate in resource usage balancing with the second network based at least partly on the first information
- the system is further configured to participate in the resource usage balancing at least partly based on second information, describing an extent of resource usage of second VNF in the second network, the second VNF being run on behalf of the first network
- the at least one processing core is further configured to determine a need to increase resources allocated to the first VNF, or detect spare capacity in the first network, and, responsively, to obtain authorization from the second network to increase the resources allocated to the first VNF in the first network.

According to a second aspect of the present invention, there is provided a method comprising storing a list of virtualized network functions, VNFs, active in a first network, processing, in the first network, a request originating in a second network, requesting to run a first VNF in the first network on behalf of the second network, and based at least partly on the request, causing instantiation of the first VNF in the first network.

Certain embodiments of the second aspect may comprise at least one feature from the following bulleted list:
- allocating resources to the first VNF
- allocating resources to the first VNF dynamically
- configuring the first VNF with at least one interface to the second network
- compiling first information, describing an extent of resource usage of the first VNF in the first network
- the resources comprise at least one of electrical power, increased radio interference, processing resources and memory resources
- participating in resource usage balancing with the second network based at least partly on the first information
- participating in the resource usage balancing at least partly based on second information, describing an extent of resource usage of a second VNF in the second network, the second VNF being run on behalf of the first network
- determining a need to increase resources allocated to the first VNF, and, responsively, obtaining authorization from the second network to increase the resources allocated to the first VNF in the first network.

According to a third aspect of the present invention, there is provided an system comprising means for storing a list of virtualized network functions, VNFs, active in a first network, means for processing, in the first network, a request originating in a second network, requesting to run a first VNF in the first network on behalf of the second network, and means for causing instantiation of the first VNF in the first network based at least partly on the request.

According to a fourth aspect of the present invention, there is provided a non-transitory computer readable medium having stored thereon a set of computer readable instructions that, when executed by at least one processor, cause an apparatus to at least store a list of virtualized network functions, VNFs, active in a first network, process, in the first network, a request originating in a second network, requesting to run a first VNF in the first network on behalf of the second network, and cause instantiation of the first VNF in the first network based at least partly on the request.

According to a fifth aspect of the present invention, there is provided a computer program configured to cause a method in accordance with the second aspect to be performed.

EMBODIMENTS

By running a virtualized network function, VNF, in a first network on behalf of a second network, sharing of network resources can be facilitated. Such resources may include geographic reach and/or computational resources, for example. Scaling of resources allocated to this virtualized network function may be made subject to authorization from the second network, as usage of resources in the first network may affect a resource settlement between the first and second networks.

Figure 1:
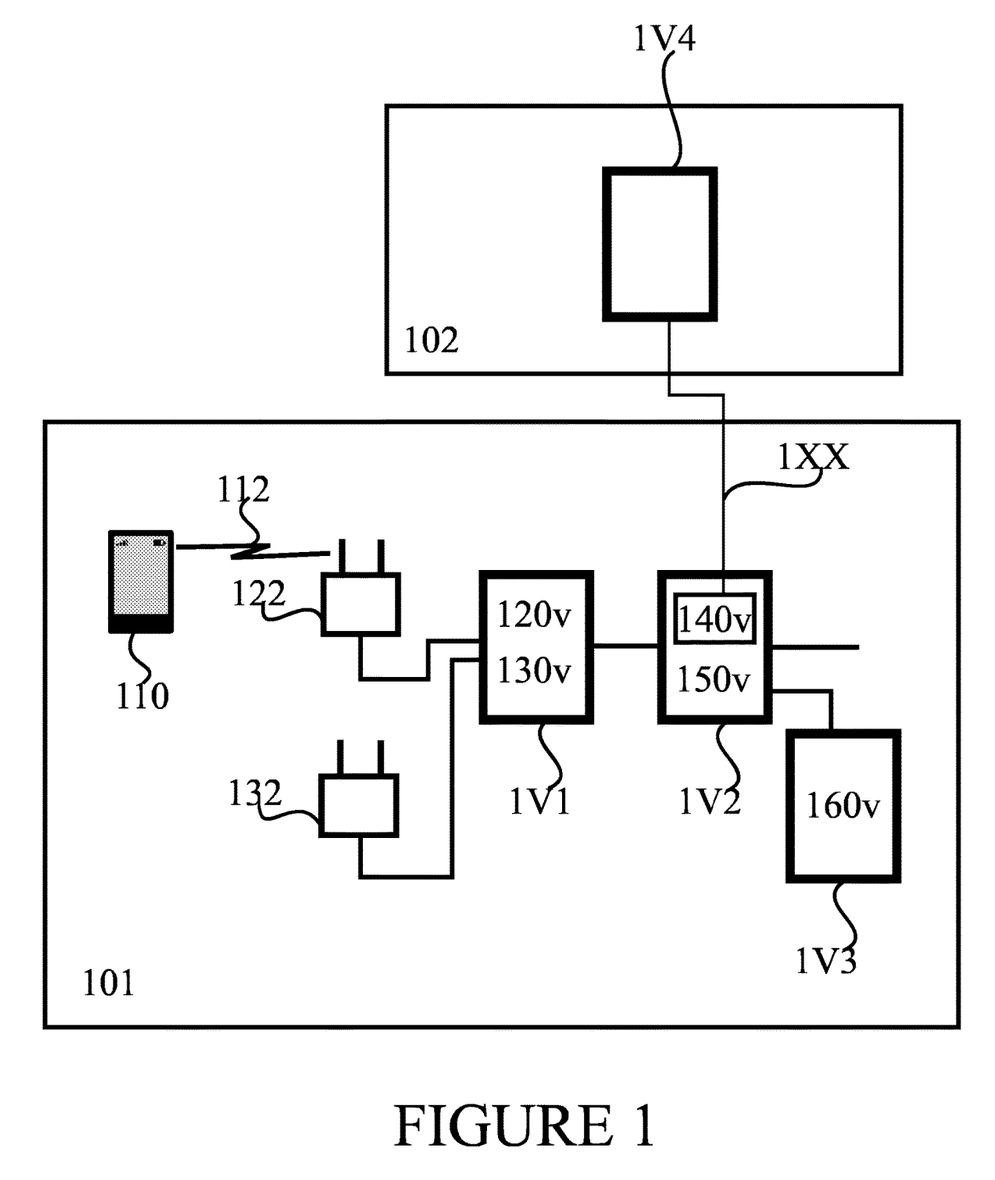
FIG. 1 illustrates an example system capable of supporting at least some embodiments of the present invention.

FIG. 1 illustrates an example system capable of supporting at least some embodiments of the present invention. In the system of FIG. 1, mobile 110 has a wireless link 112 with radio node 122. Radio node 122 is a reduced version of a base station, the radio node comprising radio hardware but less, or no, information processing functions. Radio nodes 122 and 132 take the places of base station in the system of FIG. 1. Radio node 122 and radio node 132 are both separately connected with server 1V1, which comprises a computer system configured with computing resources, such as processing cores and memory, arranged to be able to run the information processing capabilities of normal base stations that are absent in the radio nodes of FIG. 1. In other words, at least part of information processing functions of normal base stations have been placed in server 1V1 in the system of FIG. 1.

The information processing functions relating to radio node 122 that take place in server 1V1 are denoted as virtualized base station 120v. The information processing functions relating to radio node 132 that take place in server 1V1 are denoted as virtualized base station 130v.

Server 1V2 is in the system of FIG. 1 configured to run virtualized versions of core network nodes. In the system of FIG. 1, server 1V2 runs a virtualized core network node 140v may comprise, for example, a mobility management entity, MME, or a router. Core network node 140v is further operably connected to further virtualized core network node 150v. Further core network node 150v may comprise a gateway, for example, configured to provide access to further networks, such as the Internet, for example. In use, virtualized base station 120v may receive information from radio node 122 and perform processing operations on the received information. Virtualized base station 120v may be configured to forward information it has processed to virtualized core network node 140v in server 1V2, for example. A further server 1V3 may be comprised in the system, being configured to run a virtualized subscriber register 160v, for example.

Servers 1V1, 1V2 and 1V3 may be based on generic computation technology, such as a set of x86-architecture multi-core processors or reduced instruction set computing, RISC, processors, for example. Server 1V1 need not be based on the same computation technology as server 1V2.

Mobile 110, radio nodes 122 and 132, as well as servers 1V1, 1V2 and 1V3 are in the system of FIG. 1 comprised in network 101. A second network, 102, is further illustrated in FIG. 1. For the sake of clarity, in network 102 is illustrated only one server, 1V4, although network 102 may naturally comprise a plurality of further, non-illustrated, nodes. In FIG. 1, network 101 runs virtualized core network node 140v on behalf of network 102. Running a virtualized network function on behalf of another network comprises running this virtualized network function in a server of the network, such that the virtualized network function runs for the benefit of the another network. The virtualized network function concerned may have an interface 1XX to the other network, for example to a server comprised in the other network. Interface 1XX may be used to convey configuration information and/or network traffic. The other network may be experiencing a shortage of capacity, or the other network may lack coverage in a certain geographic area, for example. Alternatively or additionally to a virtualized core network node, a virtualized base station or indeed, in general another kind of virtualized network function may be run in a first network on behalf of a second network. More than one virtualized network function may be so run on behalf of the second network in the first network.

In general, a virtualized network function may comprise a software entity on generic computing hardware that is configured to perform, at least in part, according to a same specification as a corresponding network function that has not been virtualized, that is, one that runs on dedicated hardware. By generic computing hardware it is meant hardware that is not designed to run a specific type of virtualized network function. In other words, a virtualized network function may comprise a software implementation of a logical network node of a communication network. This has the effect that in terms of other network elements, these other elements needn't know whether the network element has been virtualized or not. Therefore, a virtualized call session control function, CSCF, for example, can be sent the same kinds of messages as a non-virtualized CSCF. A virtualized network function, VNF, may comprise of multiple virtualized network function components, VNFCs.

The system of FIG. 1 offers advantages over a system that lacks virtualized network functions. In detail, virtualized base station 120v may be scaled according to need, whereas a non-virtualized base station must be dimensioned for the maximum expected load at all times. For example, when load is light, virtualized base station 120v may be run with a few, or only one, processing core in server 1V1, while other processing cores of server 1V1 may be used for other processing tasks, such as grid computing, for example. As a response to increasing load via radio node 122, virtualized base station 120v may be allocated more processing cores in a dynamic network management action.

The system of FIG. 1 may perform network management actions, each network management action involving at least one virtualized network function or virtualized network function component. Virtualized network functions may comprise, for example, virtualized base stations and/or virtualized core network nodes. The network management action may comprise at least one of the following: increasing resources allocated to a virtualized network function or virtualized network function component, decreasing resources allocated to a virtualized network function or virtualized network function component, starting a virtualized network function or virtualized network function component instance, and terminating a virtualized network function or virtualized network function component instance.

Starting a virtualized network function or virtualized network function component instance may comprise initializing, for example based at least in part on a template or image, a new virtualized network function or virtualized network function component. In terms of FIG. 1, this might comprise, for example, initializing a further virtualized core network node, "155v" in server 1V2. The new virtualized network function, or node, may be allocated resources in terms of at least one processor core and memory. A new virtual network function may be considered onboarded once associated software images/templates have been uploaded to the virtual infrastructure and have been added to a list of virtualized network functions, and instantiated once it has been assigned computational resources. Normally, virtualized network functions are both onboarded and instantiated.

Terminating a virtualized network function may correspondingly comprise ending processor tasks that run the virtualized network function. Terminating may be smooth in nature, wherein, for example, any users served by a virtualized network function that is to be terminated are handed over to another virtualized network function, to avoid broken connections. Terminating may also be abrupt, for example where it is determined a virtualized network function is misbehaving, operators may select abrupt termination. Misbehaviour may be determined by comparing a VNF's behaviour to a behavioural pattern, for example.

The number of servers may be selected independently of the embodiment and network implementation. For example, one, three or seven servers may be used. In general, a server is an example of a computation apparatus arranged to run virtualized network functions and/or virtualized network function components. Such an apparatus may alternatively be referred to as a computational substrate.

In general, a node in a first network may process a request, originating in a second network, requesting to run a first VNF on behalf of the second network. The request may comprise a description of the VNF the second network would like the first network to run, or a pointer to such a description, for example. Accepting the request may be based on determining, whether the networks have an agreement in place that enabled such actions. Where the request is accepted, the first network may begin to compile information concerning resources the VNF used in the first network, while operating on the behalf of, and for the benefit of, the second network. A VNF running in the first network on behalf of the second network may be run on a computational substrate, such as a server, comprised in the first network. Such resource use may be monitored in terms of processing resources consumed, memory used, radio interference caused and/or network interconnect capacity consumed. Where an interface 1XX is enabled to the second network, the resources used by this interface may be included in the monitoring.

In case the second network, in turn, runs one or more VNFs on behalf of the first network, the two networks may perform settlements concerning resources consumed by VNFs they run on behalf of each other. A goal of such settlements may be to maintain at least a rough equivalence between resources the networks invest in running VNFs on behalf of each other, such that one of the networks does not become relatively more burdened by hosting VNFs on behalf of another network. The settlements may be seen as a network management action, such that both networks maintain reasonable throughput in relation to their resource usage. In principle, a network may obtain a similar throughput with its resources if it runs VNFs on behalf of other networks, if it in turn has these other networks run VNFs on its behalf, and benefits from throughput generated by these VNFs.

In some embodiments, imbalances in resource use detected in settlements may be settled by monetary or other suitable transactions, such that the network that uses less resources in running VNFs on behalf of the other pays compensation to the other network.

Figure 2:
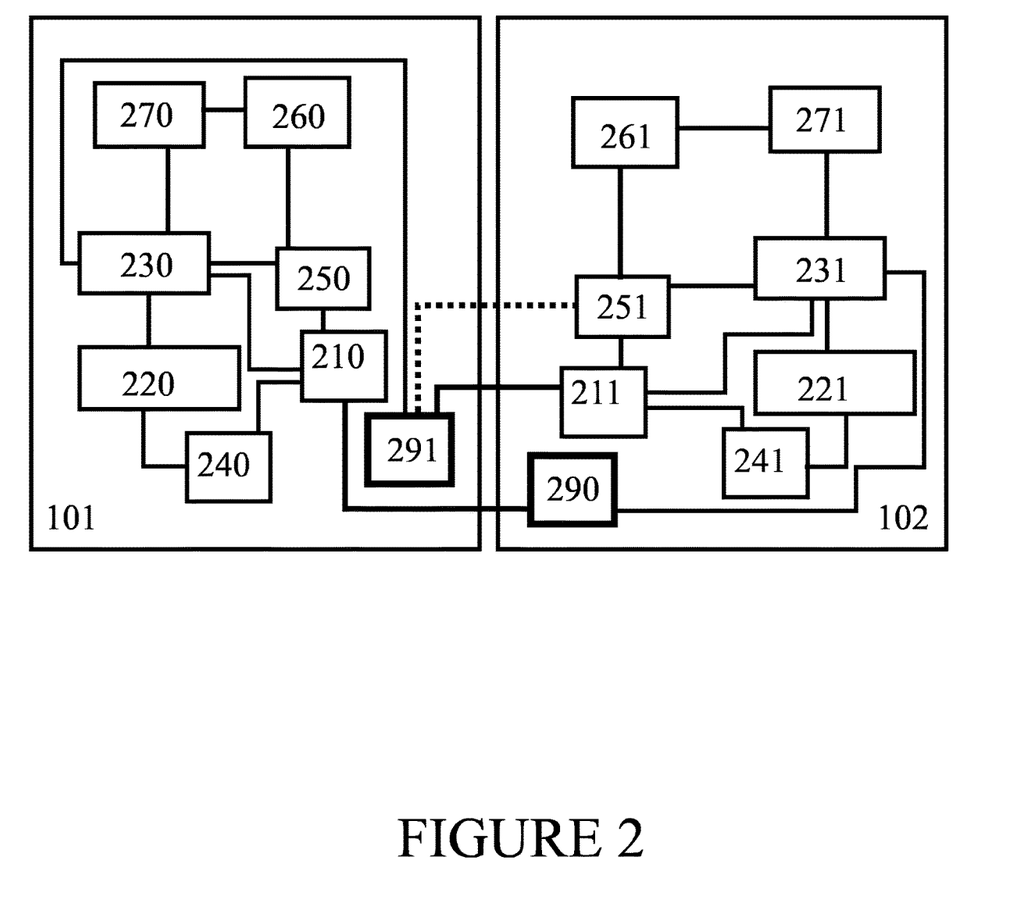
FIG. 2 illustrates an example network architecture in accordance with at least some embodiments of the present invention.

FIG. 2 illustrates an example network architecture in accordance with at least some embodiments of the present invention. FIG. 2 comprises, like FIG. 1, networks 101 and 102. Each network may separately be considered to be a system. The compound system of network 101 and network 102 may also be considered to be a system. In FIG. 2, VNF 210 comprises a virtualized network function, such as for example a virtualized network function as described above in connection with FIG. 1. VNF 210 has an interface with VNF manager 230, wherein VNF manager 230 may be configured to initiate network management actions, for example, responsive to changes in a loading level of virtualized network functions or responsive to a determined fault condition. VNF manager 230 has an interface with virtualized infrastructure manager, VIM, 220. VIM 220 may implement a monitoring function to detect virtualized network functions that cross loading or other predefined thresholds, to responsively trigger network management actions. For example, where a loading level exceeds a first threshold, more resources may be allocated to the virtualized network function, and/or where the loading level decreases below a second threshold, resources may be allocated from the virtualized network function to other uses. NFV orchestrator, NFVO, 270 and/or another node may be configured to take a network management action with at least one operating condition of the network. The architecture may comprise a plurality of VNFs 210, VIMs 220 and/or a plurality of VNF managers, VNFMs, 230.

Both VNF 210 and VIM 220 have interfaces to network functions virtualization infrastructure, NFVI, 240. NFVI 240 may provide a set of hardware and software components that build up the environment in which VNFs are deployed. VNF 210 further has an interface with element manager, EM, 250. EM 250 may provide end-user functions for management of a set of related types of network elements which may include network elements with virtualized network functions or non-virtualized network functions, or both. These functions may be divided into two main categories: Element Management Functions and Sub-Network Management Functions. In some embodiments, EM 250 may be configured to take decisions concerning network management actions, and to cause the decisions to be implemented by signalling concerning them to VNF manager 230, for example. EM 250 may take decisions concerning network management functions as a response to a determined fault condition, for example. EM 250 has an interface with operational support systems and/or business support systems, OSS/BSS 260. OSS/BSS 260 may be configured to support end-to-end telecommunication services. OSS/BSS 260 may implement load monitoring, for example. OSS/BSS 260 in turn has an interface with NFV Orchestrator, NFVO, 270. NFVO 270 may comprise a VNF catalogue, a list of known VNFs referred to above.

Network 102 comprises similar structure as network 101, in detail, VNF 211, VIM 221, VNFM 231, NFVI 241, EM 251, OSS/BSS 261 and NFVO 271. In the compound system of FIG. 2, network 101 runs VNF 291 on behalf of network 102. Network 102, on the other hand, runs VNF 290 on behalf of network 101. VNF 291 is furnished with an interface to network 102, in this example to VNF 211 of network 102. Likewise, in this example VNF 290 is furnished with an interface to network 101, to VNF 210. Thus, network 102 may use VNF 291 as part of its processing chain of VNFs and network 101 may use VNF 290 as part of its processing chain of VNFs.

VIMs of the respective networks, for example, may be configured to compile the information concerning resources used by VNFs run on behalf of other networks. A VNFM, for example, may determine that a VNF run on behalf of another network may need additional capacity. Responsively, such a VNFM may request scaling-up of capacity for this VNF, for example from a NFVO. The NFVO may, before authorizing the scale-up, request permission from the network on behalf of which the VNF is being run, and only once such permission is obtained, the NFVO will instruct the VNFM that the scale-up may proceed.

While an EM may have an interface with a VNF or VNFC that is run on behalf of another network, this is not necessarily the case. For example, where the VNF or VNFC is relatively simple, its configuration may be part of an onboarding package, for example in a template or image provided. In these cases, it is assumed the configuration doesn't need fine tuning for the specific instance being requested to be run in a hosting network. An EM-VNF interface is illustrated in FIG. 2 as a dotted line interface between EM 251 and VNF 291.

For example, a scale-up may be needed where subscribers of the other network, who use the VNF run on behalf of the other network, use high-bandwidth services such as streaming high-definition media. The other network may decide on allowing the scale-up, knowing that the scale-up will result in increased resources used on its behalf in the network hosting the VNF, which will lead to demands, such as financial claims, from the hosting network when resource usage is settled later on. If the other network cannot afford the settlement with the scale-up, for example due to high load in its network, it may refuse the scale-up. In case the load is high, the other network may be unable to provide, via the settlement, corresponding resources to VNFs it hosts. When refusing, the other network may configure bandwidth limits to subscribers relying on the VNF run on behalf of the other network in the host network, to thereby render the scale-up unnecessary. Generally, in some preferred embodiments of the present invention, the other network is advantageously provided with an opportunity to enforce scaling or particularly, dynamic scaling, of resources allocated to the VNF run in the hosting network on behalf of the other network. Accordingly, situations wherein e.g. the hosting network autonomously up-scales (due to e.g. extra capacity detected) or down-scales the resources dynamically to a level not tolerable by the other network, can be cleverly omitted. The preferred procedure may involve proactively notifying or generally informing, by the hosting network or an element functionally connected thereto, the other network about a future change (e.g. a suggested change, intended change, etc.) in the level of resource usage in the hosting network for running the VNFs on behalf of the other network. The other network may then evaluate the effects of the change according to selected logic (e.g. in terms of cost or other factors) and allow or reject the change, and respond to the hosting network accordingly. In some embodiments, the other network may e.g. initially agree on or inform the hosting network about the level of resource usage (e.g. maximum, average, minimum) it tolerates or accepts from the hosting network for duly executing the VNFs on its behalf without further negotiation. If the hosting network is about to go beyond the agreed resource usage, it may notify the other network to obtain a permission as contemplated above. The information transfer concerned such as the aforementioned notifications may include e.g. transmission, conveying, and receipt of applicable signaling messages between the relevant parties and potential intermediate entities as being easily understood by a person skilled in the art.

Figure 3:
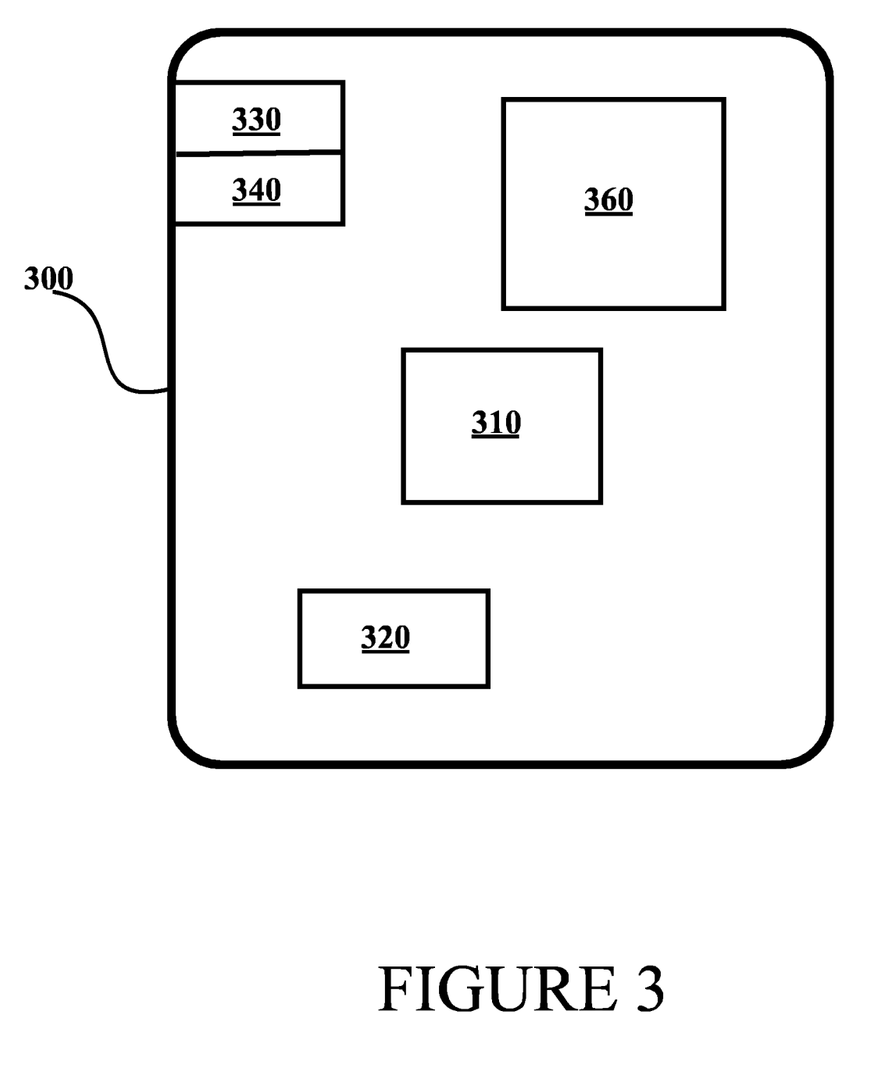
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a server of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one AMD Opteron and/or Intel Core processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Ethernet and/or worldwide interoperability for microwave access, WiMAX, standards, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to manage actions regarding quarantined network nodes.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. In some embodiments, device 300 lacks at least one device described above.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
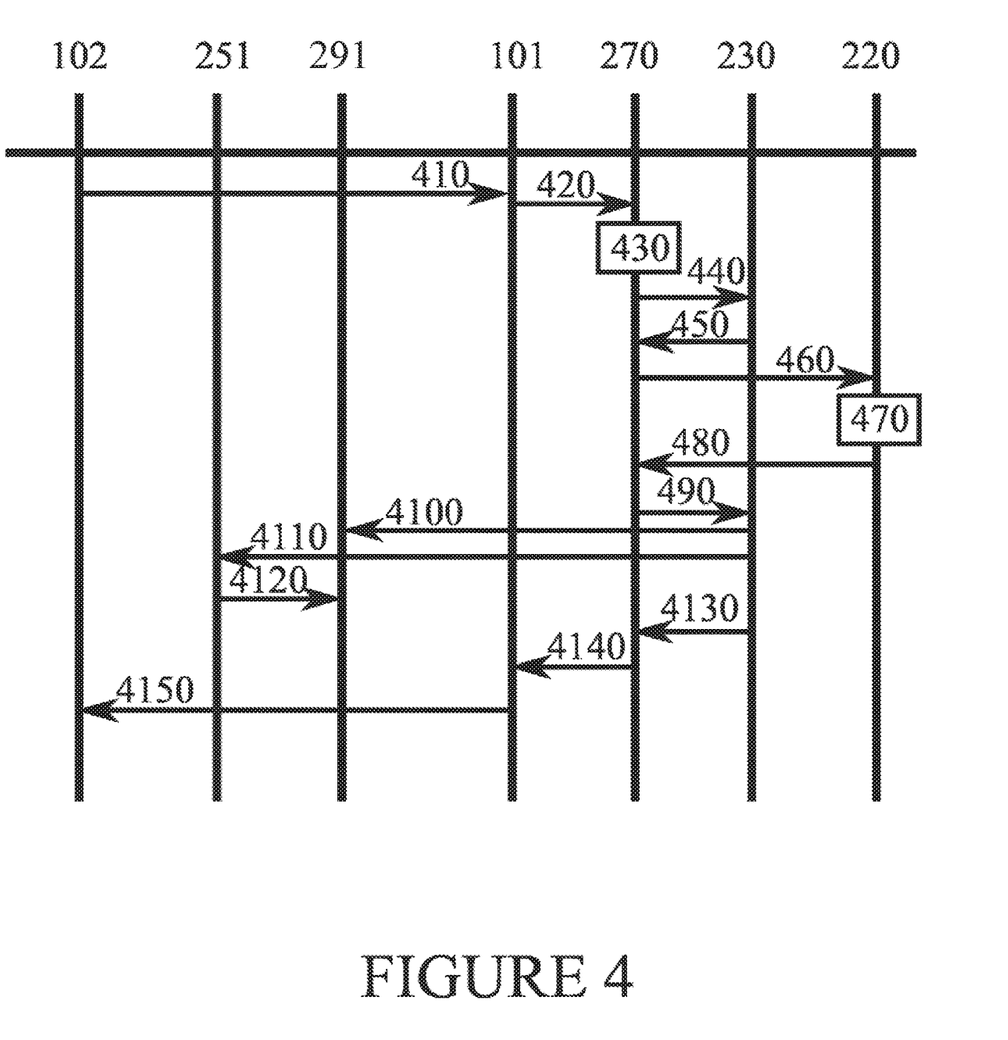
FIG. 4 illustrates signalling in accordance with at least some embodiments of the present invention.

FIG. 4 illustrates signalling in accordance with at least some embodiments of the present invention. On the vertical axes are disposed, from the left, network 102, EM 251, VNF 291, network 101, NFVO 270, VNFM 230 and, finally, VIM 220. VNF 291 is run by network 101 on behalf of network 102. Time advances from the top toward the bottom. Network 101 and network 102 may in this context refer to a management point of these networks, respectively, for example.

An agreement between network 101 and network 102 on settling resource usage may precede phase 410. In phase 410, network 102 provides information concerning a VNF it requests network 101 to run on its behalf. Such information may comprise a VNF template or image, or a pointer to such a template or image, for example. Responsively, network 101 may request 420 NFVO 270 to onboard and instantiate the new VNF.

NFVO 270 may validate the request, phase 430, and request VNF instantiation from VNFM 230, phase 440, responsive to successful validation in phase 430. VNFM 230 may process the request, and allocate initial resources to the VNF in phase 450, by signalling to the NFVO 270. In phase 460, NFVO 270 instructs VIM 220 to set-up the allocated resources, and an interface from the new VNF to the requesting network, 102. Responsively, in phase 470, VIM 220 allocates internal and inter-network connectivity. VIM 220 also allocates a virtual machine and attaches it to network 101, and then provides an acknowledgement back to NFVO 270, phase 480.

In phase 490, NFVO 270 acknowledges to VNFM 230 completion of resource allocation. In phase 4100, VNFM 230 configured VNF 291, and in phase 4110 VNFM 230 notifies EM 251 of successful VNF instantiation, concerning VNF 291. In phase 4120, EM 251 configured VNF 291.

In phase 4130, VNFM 230 acknowledged end of VNF instantiation to NFVO 270, and NFVO acknowledges the same to network 101 in phase 4140. Finally, in phase 4150 network 101 informs network 102 of VNF instantiation.

Overall via the process of FIG. 4, the VNF is instantiated in the hosting network, to run there on behalf of the requesting network. Being instantiated in the hosting network may comprise, for example, that the VNF runs on a computational substrate of the hosting network.

Figure 5:
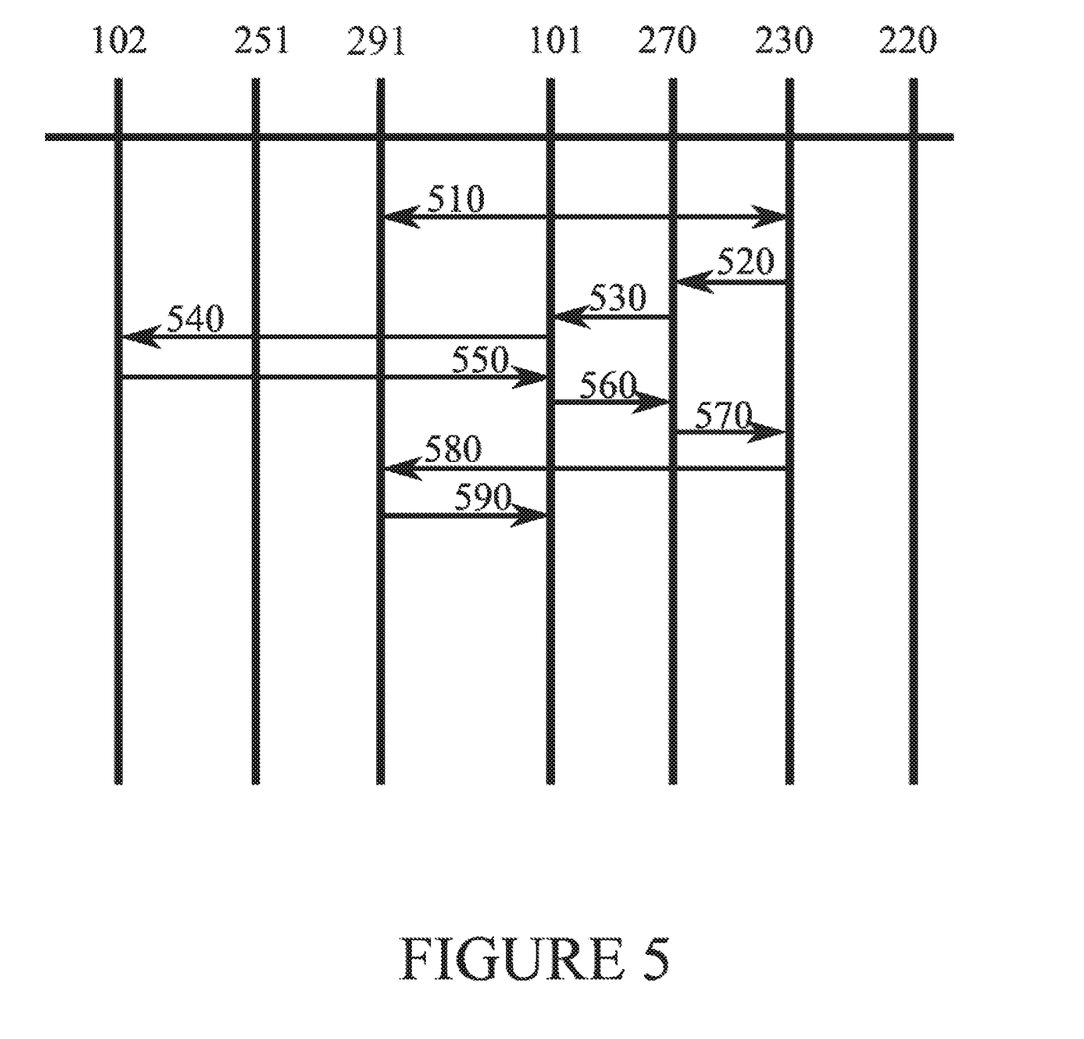
FIG. 5 illustrates signalling in accordance with at least some embodiments of the present invention.

FIG. 5 illustrates signalling in accordance with at least some embodiments of the present invention. The vertical axes correspond to those of FIG. 4. Overall the signalling sequence of FIG. 5 is an example. In general, in various embodiments a trigger or request to scale may originate in nodes other than a VNFM. For example an NVFO At the beginning of the process illustrated in FIG. 5, VNF 291 is run in network 101, on behalf of network 102. VNF 291 is provided with an interface to network 102, to thereby communicatively couple it to network 102.

In phase 510, VNFM 215 determines VNF 291 is in need of up-scaling resources, for example, that instead of a current two processor cores, VNF 291 would need ten cores. Responsively, VNFM 230 requests scaling from NFVO 270, phase 520.

NFVO 270 requests permission to scale-up the resources from network 101, which in turn requests permission, as described above, from network 102, phases 530 and 540, respectively. More generally, available extra capacity on the side of network 101 could be indicated towards network 102 to enable network 102 to decide upon usage thereof. In the illustrated example, network 102 decides to allow the scaling-up, and indicates this back to network 101 in phase 550. Responsively, in phase 560 network 101 instructs NFVO 270 to proceed with the scaling, and in phase 570 NFVO 270 instructs VNFM 230 to perform the scaling.

In phase 580, VNFM 230 performs the scaling. Finally, in phase 590 VNF 291 informs network 101 of the change in resource usage, to thereby enable network 101 to participate in resource usage settlement with network 102.

Figure 6:
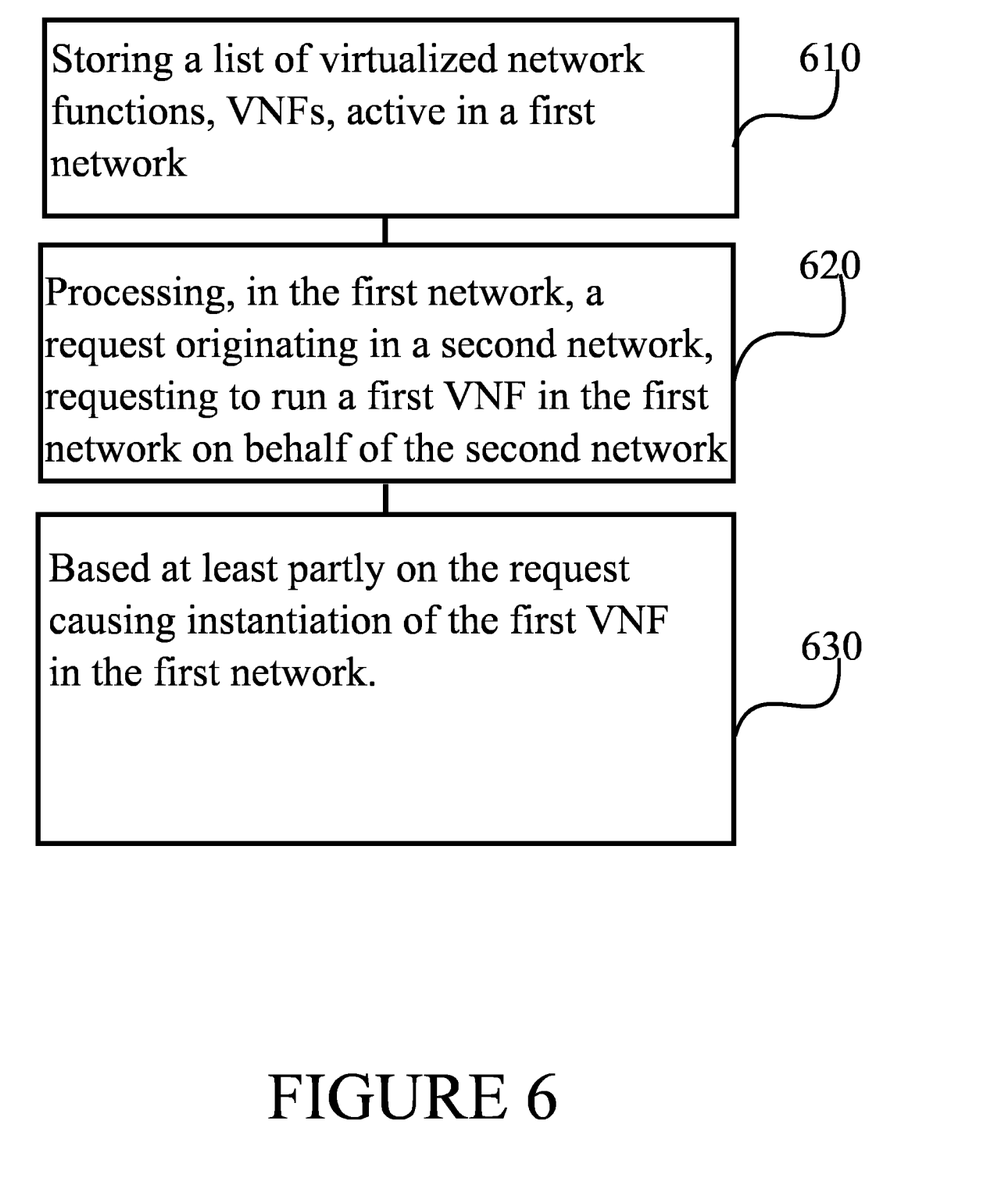
FIG. 6 is a flow graph of a method in accordance with at least some embodiments of the present invention.

FIG. 6 is a flow graph of a method in accordance with at least some embodiments of the present invention. The phases of the illustrated method may be performed in a computational substrate of a network, such as a server, for example, or in a control device configured to control the functioning thereof, when implanted therein.

Phase 610 comprises storing a list of virtualized network functions, VNFs, active in a first network. Phase 620 comprises processing, in the first network, a request originating in a second network, requesting to run a first VNF in the first network on behalf of the second network. Finally, phase 630 comprises, based at least partly on the request, causing instantiation of the first VNF in the first network.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing communication network interworking.

REFERENCE SIGNS LIST

| | |
|---|---|
| 101, 102 | Networks |
| 122, 132 | Radio nodes |
| 120v, 130v | Virtualized base stations |
| 140v, 150v | Virtualized core network nodes |
| 160v | Virtualized subscriber register |
| IV1, IV2, IV3, IV4 | Servers |
| 110 | Mobile |
| 112 | Wireless link |
| 1XX | Interface |
| 210, 211 | VNFs |
| 220, 221 | VIMs |
| 230, 231 | VNFMs |
| 240, 241 | NFVIs |
| 250, 251 | Ems |
| 260, 261 | OSS/BSSs |
| 270, 271 | NFVOs |
| 290, 291 | VNFs run on behalf of another network (hosted VNFs) |
| 300-360 | Structure of the device of FIG. 3 |
| 410-4150 | Phases of signaling illustrated in FIG. 4 |
| 510-590 | Phases of signaling illustrated in FIG. 5 |
| 610-630 | Phases of the method of FIG. 6 |

The invention claimed is:

1. A system comprising:
   a memory configured to store a list of virtualized network functions, VNFs, active in a first network; and
   a network functions virtualization orchestrator (NFVO), a virtualized network function manager (VNFM), and a virtualized network infrastructure manager (VIM) of at least one processing core configured to process a request requesting to run a first VNF in the first network, wherein:
   the NFVO, VNFM, and VIM are located in the first network;
   the NFVO having the memory;
   the request originates in a second network to run the first VNF on behalf of the second network;
   the NFVO is arranged to validate the request and to request instantiation of the first VNF from the VNFM;
   the VNFM, in turn, is arranged to:
     process the request for instantiation of the first VNF from the NVFO;
     allocate resources to the first VNF; and
     signal to the NFVO;
   the NFVO being further arranged to instruct the VIM;
   the VIM, in turn, being arranged to set-up the allocated resources and set-up an interface from the first VNF to the second network;
   the VNFM being further arranged to acknowledge an end of the instantiation of the first VNF to the NFVO which then is further arranged to provide to the second network the acknowledgement of the end of the instantiation of the first VNF;
   the NFVO and VNFM being further arranged to determine a need to increase resources allocated to the first VNF and, responsive to the determination of the need, being arranged to obtain authorization from the second network in order to increase the resources allocated to the first VNF where, in the case of receiving the authorization from the second network to increase the allocated resources, the VNFM increases the resources for the first VNF.

2. The system according to claim 1, wherein the VNFM is further configured to allocate resources to the first VNF dynamically.

3. The system according to claim 1, wherein the system is configured to configure the first VNF with more than one interface to the second network.

4. The system according to claim 1, wherein the system is configured to compile first information, describing an extent of resource usage of the first VNF in the first network.

5. A method comprising:
   storing a list of virtualized network functions, VNFs, active in a first network;
   processing, in the first network, a request originating in a second network, requesting to run a first VNF in the first network on behalf of the second network, wherein the request comprises a description of the VNF the second network would like the first network to run;
   validating the request by a network functions virtualization orchestrator (NVFO) of the first network;
   requesting, by the NVFO, an instantiation of the first VNF from a virtualized network function manager (VNFM) of the first network;
   processing, by the VFNM, the request for instantiation from the NVFO;
   allocating, by the VFNM, resources to the first VNF;
   signaling, by the VNFM, to the NFVO;
   instructing, by the NFVO, a virtualized network infrastructure manager (VIM);
   setting up, by the VIM, the allocated resources and an interface from the first VNF to the second network;
   acknowledging, by the VNFM, an end of the first VNF instantiation to the NFVO;
   providing, by the NFVO, the acknowledgement to the second network;
   determining, by the NFVO and VFNM, a need to increase resources allocated to the first VNF;
   obtaining authorization, by the NVFO and VFNM, from the second network to increase the resources to the VNF when the need to increase the resources is determined by the NFVO and VFNM; and
   increasing, by the VNFM, resources for the first VNFM when the authorization to increase resources from the second network is received by the NVFO and VFNM
   based at least partly on the request, causing instantiation of the first VNF in the first network.

6. The method according to claim 5, further comprising allocating resources to the first VNF dynamically.

7. The method according to claim 5, further comprising setting up, by the VIM, more than one interface from the first VNF to the second network.

8. The method according to claim 5, further comprising compiling first information, describing an extent of resource usage of the first VNF in the first network.

9. The method according to claim 8, wherein the resources comprise at least one of electrical power, increased radio interference, processing resources and memory resources.

10. The method according to claim 8, further comprising participating in resource usage balancing with the second network based at least partly on the first information.

11. The method according to claim 10, further comprising participating in the resource usage balancing at least partly based on second information, describing an extent of resource usage of a second VNF in the second network, the second VNF being run on behalf of the first network.

12. The method according to claim 5, further comprising detecting available capacity in the first network and obtaining authorization from the second network to increase the resources allocated to the first VNF based thereon.

13. A non-transitory computer readable medium having stored thereon a set of computer readable instructions that, when executed by at least on processor, cause an apparatus to at least:
   store a list of virtualized network functions, VNFs, active in a first network;
   process, in the first network, a request originating in a second network, requesting to run a first VNF in the first network on behalf of the second network, wherein the request comprises a description of the VNF the second network would like the first network to run;
   validating the request by a network functions virtualization orchestrator (NVFO) of the first network;
   requesting, by the NVFO, an instantiation of the first VNF from a virtualized network function manager (VNFM) of the first network;
   processing, by the VFNM, the request for instantiation from the NVFO;
   allocating, by the VFNM, resources to the first VNF;
   signaling, by the VNFM, to the NFVO;
   instructing, by the NFVO, a virtualized network infrastructure manager (VIM);
   setting up, by the VIM, the allocated resources and an interface from the first VNF to the second network;
   acknowledging, by the VNFM, an end of the first VNF instantiation to the NFVO;
   providing, by the NFVO, the acknowledgement to the second network;
   determining, by the NFVO and VFNM, a need to increase resources allocated to the first VNF;
   obtaining authorization, by the NVFO and VFNM, from the second network to increase the resources to the VNF when the need to increase the resources is determined by the NFVO and VFNM; and
   increasing, by the VNFM, resources for the first VNFM when the authorization to increase resources from the second network is received by the NVFO and VFNM.

* * * * *